(12) United States Patent
Amine et al.

(10) Patent No.: US 9,362,599 B2
(45) Date of Patent: Jun. 7, 2016

(54) NON-AQUEOUS ELECTROLYTES FOR LITHIUM-AIR BATTERIES

(75) Inventors: Khalil Amine, Oak Brook, IL (US); Zonghai Chen, Bolingbrook, IL (US); Zhengcheng Zhang, Naperville, IL (US)

(73) Assignee: UCHICAGO ARGONNE LLC, Chicago, IL (US)

( * ) Notice: Subject to any disclaimer, the term of this patent is extended or adjusted under 35 U.S.C. 154(b) by 273 days.

(21) Appl. No.: 14/008,414

(22) PCT Filed: Apr. 5, 2012

(86) PCT No.: PCT/US2012/032302
§ 371 (c)(1),
(2), (4) Date: Sep. 27, 2013

(87) PCT Pub. No.: WO2012/138844
PCT Pub. Date: Oct. 11, 2012

(65) Prior Publication Data
US 2014/0023941 A1    Jan. 23, 2014

Related U.S. Application Data

(60) Provisional application No. 61/472,282, filed on Apr. 6, 2011.

(51) Int. Cl.
H01M 10/0568 (2010.01)
H01M 12/02 (2006.01)
H01M 10/0569 (2010.01)
H01M 12/06 (2006.01)

(52) U.S. Cl.
CPC .......... *H01M 12/02* (2013.01); *H01M 10/0568* (2013.01); *H01M 10/0569* (2013.01); *H01M 12/06* (2013.01); *H01M 2300/0025* (2013.01)

(58) Field of Classification Search
CPC ............. H01M 10/0568; H01M 10/0569; H01M 12/06
USPC ................................... 429/405, 403
See application file for complete search history.

(56) References Cited

U.S. PATENT DOCUMENTS

| | | |
|---|---|---|
| 5,510,209 A | 4/1996 | Abraham et al. |
| 6,022,643 A | 2/2000 | Lee et al. |
| 7,344,804 B2 | 3/2008 | Klaassen |
| 7,507,503 B2 | 3/2009 | Amine et al. |
| 7,968,235 B2 | 6/2011 | Amine et al. |
| 2006/0147809 A1 | 7/2006 | Amine et al. |
| 2009/0081557 A1 | 3/2009 | Chen et al. |
| 2010/0266907 A1 | 10/2010 | Yazami |

FOREIGN PATENT DOCUMENTS

KR    10-2010-0097621    9/2010

OTHER PUBLICATIONS

Abraham, K.M. et al., "A Polymer Electrolyte-Based Rechargeable Lithium/Oxygen Battery", Journal of Electrochemical Society, 1996, 143, pp. 1-5.
International Search Report and Written Opinion for Intl. Pat. Appln. No. PCT/US2012/032302, mailed Nov. 28, 2012, 11 pp.

*Primary Examiner* — Edward Cain
(74) *Attorney, Agent, or Firm* — Foley & Lardner LLP

(57) ABSTRACT

A lithium-air cell includes a negative electrode; an air positive electrode; and a non-aqueous electrolyte which includes an anion receptor that may be represented by one or more of the formulas.

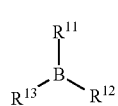

V

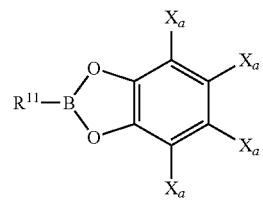

VI

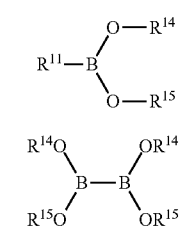

VII

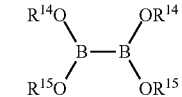

VIII

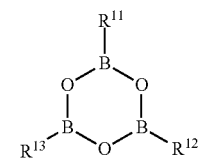

IX

18 Claims, 2 Drawing Sheets

NON-AQUEOUS ELECTROLYTES FOR LITHIUM-AIR BATTERIES

CROSS-REFERENCE TO RELATED APPLICATIONS

This application is a U.S. national stage application of International Application No. PCT/US2012/032302, filed on Apr. 5, 2012, which claims the benefit of U.S. Provisional Patent Application Nos. 61/472,282, filed on Apr. 6, 2011, the entire disclosures of which are incorporated herein by reference for any and all purposes.

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

Generally, the present invention relates to electrolytes for metal-air batteries.

BACKGROUND

Metal-air batteries are a class of electrochemical cells, in which oxygen, typically obtained from the ambient environment, is reduced at a catalytic cathode surface as part of the electrochemical cell reaction. The anode, which is oxidized by releasing electron to the external circuit, is typically based upon Fe, Al, Zn, Mg, or Ca and Li. Lithium-air batteries represents one type of metal-air batteries. Abraham and Jiang (see *J. Electrochem. Soc.* 143, 1-5 (1996); and U.S. Pat. No. 5,510,209) were the first to report a lithium/oxygen cell with a non-aqueous polymer separator including a film of polyacrylonitrile swollen with a PC/EC $LiPF_6$ electrolyte solution. During the discharge of the cell, oxygen is reduced at the electroactive cathode to produce oxygen ion and/or peroxide ion, which react with lithium ions to generate $Li_2O_2$ and/or $Li_2O$, which deposit on the carbon surfaces or in the pores of the electrode.

High surface area carbon materials such as carbon black and acetylene black provide numerous sites for oxygen reduction reaction and deposition of lithium peroxide and/or lithium oxide. In lithium-air batteries, a convention is defined when describing the specific capacity of the cell which uses the capacity per gram of carbon material. Thus, the specific capacity of the lithium-air cell is significantly high; and is typically on the order of 1500-2000 mAh/g of carbon, which compares to a specific number of 120-280 mAh/g for intercalating-type cathode materials for lithium ion batteries. The extremely high energy density makes lithium air batteries a promising candidate for applications in plug-in hybrid electric vehicles (PHEV) and electric vehicles (EV). The difficulty with lithium air technology is in providing practical systems that can operate in real conditions. For example, one of the major obstacles is the corrosion of lithium metal from oxygen and moisture in the atmosphere, which is a significant limitation on use in a wide variety of environments.

As described above, lithium-air batteries are not based on the intercalation mechanism of lithium-ion batteries. The specific capacity of the lithium anode is about 3800 mAh/g, which is about 10 times of the capacity of mesocarbon microbeads (MCMB) used as the negative electrodes for lithium-ion batteries. The positive electrode of the lithium-air batteries is basically a conductive porous carbon electrode, storing the critical and unlimited component of oxygen in air. However, the porous structure and surface of the cathode materials usually lose function due to the occupation of deposits by $Li_2O_2$ and/or $Li_2O$ from the prior discharge step and unable to decompose in the following process of charging. Due to this, the cycle performance of the cell gradually deteriorates.

SUMMARY

In one aspect, a lithium-air cell is provided including a negative electrode; an air positive electrode; and a non-aqueous electrolyte that includes an anion receptor represented by any one of Formulas V, VI, VII, VIII and IX or a mixture of any two or more thereof.

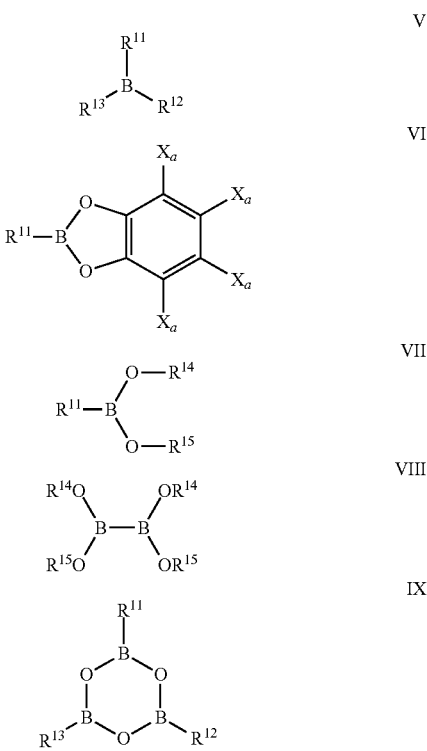

In the above formulas, $R^{11}$, $R^{12}$, and $R^{13}$ are independently halogen, alkyl, alkoxy, haloalkyl, haloalkoxy, alkenyl, alkenyloxy, haloalkenyl, haloalkenyloxy, aryl, aryloxy, haloaryl, haloaryloxy, alkaryl, alkaryloxy, haloalkaryl, or haloalkaryloxy; $R^{14}$ and $R^{15}$ are independently alkyl, haloalkyl, alkenyl, haloalkenyl, aryl, haloaryl, alkaryl, or a haloalkaryl, or $R^{14}$ and $R^{15}$ join together to form a ring including the boron and the oxygens to which $R^{14}$ and $R^{15}$ are attached; and each $X_a$ is independently H, halo, alkyl, or haloalkyl. In some embodiments, $R^{11}$, $R^{12}$, and $R^{13}$ are independently F, $C_1$-$C_6$ alkyl, $C_1$-$C_6$ fluoroalkyl, $C_1$-$C_6$ alkoxy, $C_1$-$C_6$ fluoroalkoxy, phenyl, fluorophenyl, phenyloxy, fluorophenyloxy, naphthyl, naphthyloxy, fluoronaphthyl, fluoronaphthyloxy, anthracenyl, fluoroanthracenyl, anthracenyloxy, or fluoroanthrecenyloxy. In other embodiments, $R^{11}$, $R^{12}$, and $R^{13}$ are independently methyl, trifluoromethyl, prop-2-yl, 1,1,1,3,3,3-hexafluoroprop-2-yl, 1,1,1,3,3,3-hexafluoro-2-phenyl-prop-2-yl, 1,1,1, 3,3,3-hexafluoroprop-2-oxy, phenyloxy, 4-fluorophenyloxy, 2,4-difluorophenyloxy, 2,3,5,6-tetrafluorophenyloxy, pentafluorophenyloxy, 3-trifluoromethylphenyloxy, 3,5-bis(trifluoromethyl)phenyloxy, 2,4-difluorophenyl, 3-trifluorophenyl, 2,5-bis(trifluoromethyl)phenyl, 4-fluorophenyl, 2,4-bisfluorophenyl, pentafluorophenyl, 2-trifluoromethylphenyl, phenyl, or 3,5-difluorophenyl. In any of the above embodiments, $R^{14}$ and $R^{15}$ are independently $C_1$-$C_6$ alkyl, $C_1$-$C_6$ fluoroalkyl, phenyl, fluorophenyl, naphthyl, fluoronaphthyl, anthracenyl, or fluoroanthracenyl. In any of the above embodiments, $R^{14}$ and $R^{15}$ are independently 1,1,1,3,3,3-hexafluoroprop-2-yl, phenyl, fluorophenyl, naphthyl, fluoronaphthyl, anthracenyl, or fluoroanthracenyl. In any of the above embodiments, $R^{14}$ and $R^{15}$ join together to form a compound of Formula:

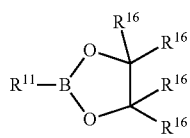

where each $R^{16}$ is independently H, alkyl, or haloalkyl. In some embodiments, $R^{16}$ is methyl or trifluoromethyl.

The anion receptor may any or more of tris(pentafluorophenyl)borane; tri(2,2,2-trifluoroethyl)borate; tri(isopropyl)borate; tris(1,1,1,3,3,3-hexafluoro-propan-2-yl)borate; tris(1,1,1,3,3,3-hexafluoro-2-phenyl-propan-2-yl)borate; tris(1,1,1,3,3,3-hexafluoro-2-(trifluoromethyl)propan-2-yl)borate; triphenyl borate; tris(4-fluorophenyl)borate; tris(2,4-difluorophenyl)borate; tris(2,3,5,6-tetrafluorophenyl)borate; tris(pentafluorophenyl)borate; tris(3-(trifluoromethyl)phenyl)borate; tris(3,5-bis(trifluoromethyl)phenyl)borate; 2-(2,4-difluorophenyl)-4-fluoro-1,3,2-benzodioxaborole; 2-(3-trifluoromethylphenyl)-4-fluoro-1,3,2-benzodioxaborole; 2,5-bis(trifluoromethyl)phenyl-4-fluoro-1,3,2-benzodioxaborole; 2-(4-fluorophenyl)-tetrafluoro-1,3,2-benzodioxaborole; 2-(2,4-difluorophenyl)-tetrafluoro-1,3,2-benzodioxaborole; 2-(pentafluorophenyl)-tetrafluoro-1,3,2-benzodioxaborole; 2-(2-trifluoromethylphenyl)-tetrafluoro-1,3,2-benzodioxaborole; 2,5-bis(trifluoromethylphenyl)-tetrafluoro-1,3,2-benzodioxaborole; 2-phenyl-4,4,5,5-tetra(trifluoromethyl)-1,3,2-benzodioxaborolane; 2-(3,5-difluorophenyl-4,4,5,5-tetrakis(trifluoromethyl)-1,3,2-dioxaborolane; 2-pentafluorophenyl-4,4,5,5-tetrakis(trifluoromethyl)-1,3,2-dioxaborolane; bis(1,1,1,3,3,3-hexafluoroisopropyl)phenylboronate; bis(1,1,1,3,3,3-hexafluoroisopropyl)-3,5-difluorophenylboronate; bis(1,1,1,3,3,3-hexafluoroisopropyl)pentafluorophenylboronate; bis(pinacolato)diboron; 1,3,5,2,4,6-trioxatriborinane; tri(ethylene glycol methyl ether)borate; tri(bis(ethylene glycol) methyl ether)borate; tri(tri(ethylene glycol) methyl ether)borate; tri(tetra(ethylene glycol) methyl ether)borate; tri(penta(ethylene glycol) methyl ether)borate; tri(hexa(ethylene glycol) methyl ether)borate; tri(hepta(ethylene glycol) methyl ether)borate. In some embodiments, the anion receptor is any one or more of tri(2,2,2-trifluoroethyl)borate, bis(pinacolato)diboron, 1,3,5,2,4,6-trioxatriborinane, tri(ethylene glycol) methyl ether)borate, tri(bis(ethylene glycol) methyl ether)borate, tri(tri(ethylene glycol) methyl ether)borate, tri(tetra(ethylene glycol) methyl ether)borate, tri(penta(ethylene glycol) methyl ether)borate, tri(hexa(ethylene glycol) methyl ether)borate, tri(hepta(ethylene glycol) methyl ether)borate. In some embodiments, the poly(ethyleneoxide) solvent is 2-[2-[2-[2-methoxy]ethoxy]ethoxy]ethoxy trimethyl silane, 2-[2-[2-methoxy]ethoxy]-ethoxy trimethyl silane, or a mixture.

In some embodiments, the non-aqueous electrolyte includes a siloxanyl carbonate. In other embodiments, the siloxanyl carbonate is 1-[1-trimethylsiloxanyl-ethyl]ethylene carbonate.

In some embodiments, the non-aqueous electrolyte includes a lithium salt. In some embodiments, the lithium salt is $LiCF_3CO_2$, $LiC_2F_5CO_2$, $LiClO_4$, $LiBF_4$, $LiAsF_6$, $LiPF_6$, $LiPF_2(C_2O_4)_2$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more lithium salts, where X is OH, F, Cl, or Br; p is 0, 1, 2, 3, 4, 5, 6, 7, 8, 9, 10, 11, or 12; and y is 0, 1, 2, 3, 4, 5, 6, 7, 8, 9, or 10.

In some embodiments, the non-aqueous electrolyte includes electrode stabilizing additive that can be oxidized or polymerized on the surface of a positive electrode, or can be reduced or polymerized on the surface of a negative electrode.

DETAILED DESCRIPTION

Figure 1:
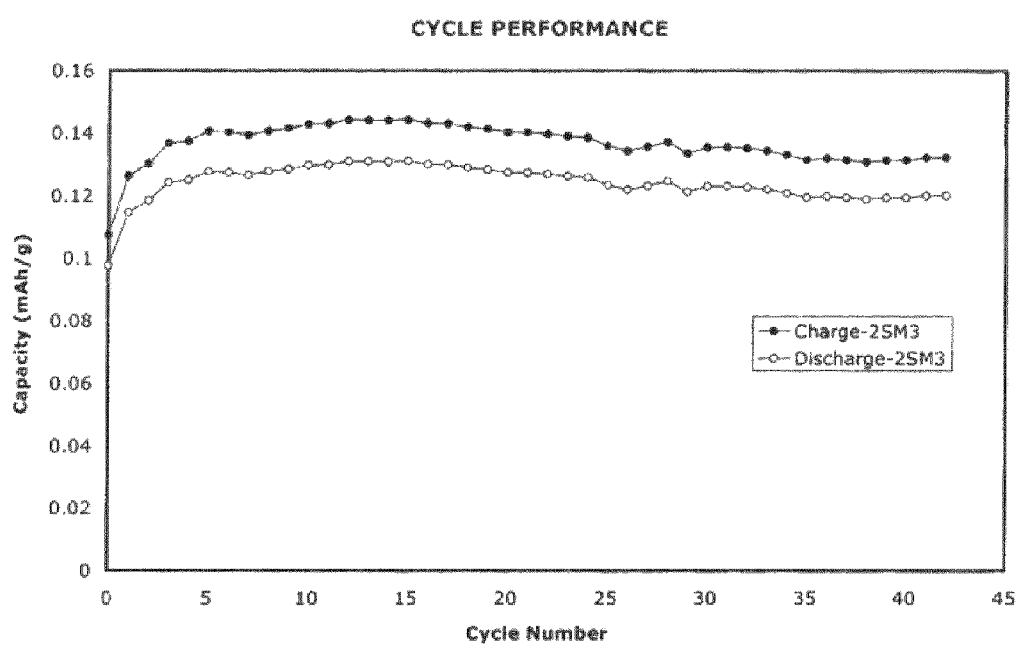
FIG. 1 is a graph showing the cycling performance of a lithium air cell with 1.0M LiTFSI (lithium bis(trifluoromethanesulfonyl)imide) in 2SM3 as solvent, and which contains 2 wt % Li[$BF_2C_2O_4$], according to Example 1.

In one aspect, a non-aqueous electrolyte for a metal air battery is provided. In some embodiments, the metal air battery is a lithium air battery. The non-aqueous electrolyte includes a solvent, a lithium salt dissolved in the solvent, and an anion receptor.

The anion receptor may be a neutral compound which contains an electron-deficient N or B atom coordinated to three substituent groups that may aid in dissolution of $LiO_2$ or LiO which are formed during the cycling of a lithium air cell. In some embodiments where the solvent is a tri-oligo(ethylene glycol)-based solvent that is a functionalized borane, it acts as both a solvent for lithium salt and as an anion receptor that can dissolve $Li_2O_2$ or $Li_2O$.

In some embodiments, the anion receptor is a neutral compound which contains an electron-deficient boron atom center. In some embodiments, the B-containing anion receptors are compounds represented by any one of Formulas V, VI, VII, VIII and IX or a mixture of any two or more thereof.

In one aspect, a lithium-air cell is provided including a negative electrode; an air positive electrode; and a non-aqueous electrolyte that includes an anion receptor represented by any one of Formulas V, VI, VII, VIII and IX or a mixture of any two or more thereof.

V

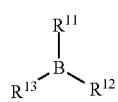

-continued

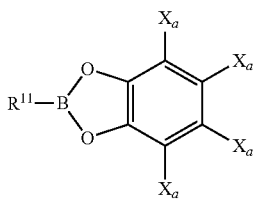

VI

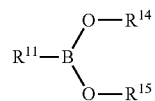

VII

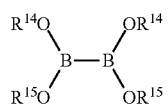

VIII

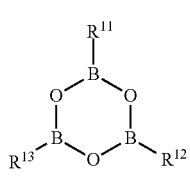

IX

In the above formulas, $R^{11}$, $R^{12}$, and $R^{13}$ are independently halogen, alkyl, alkoxy, haloalkyl, haloalkoxy, alkenyl, alkenyloxy, haloalkenyl, haloalkenyloxy, aryl, aryloxy, haloaryl, haloaryloxy, alkaryl, alkaryloxy, haloalkaryl, or haloalkaryloxy; $R^{14}$ and $R^{15}$ are independently alkyl, haloalkyl, alkenyl, haloalkenyl, aryl, haloaryl, alkaryl, or a haloalkaryl, or $R^{14}$ and $R^{15}$ join together to form a ring including the boron and the oxygens to which $R^{14}$ and $R^{15}$ are attached; and each $X_a$ is independently H, halo, alkyl, or haloalkyl. In any of the above embodiments, $X_a$ may be independently H or F. In some embodiments, $R^{11}$, $R^{12}$, and $R^{13}$ are independently F, $C_1$-$C_6$ alkyl, $C_1$-$C_6$ fluoroalkyl, $C_1$-$C_6$ alkoxy, $C_1$-$C_6$ fluoroalkoxy, phenyl, fluorophenyl, phenyloxy, fluorophenyloxy, naphthyl, naphthyloxy, fluoronaphthyl, fluoronaphthyloxy, anthracenyl, fluoroanthracenyl, anthracenyloxy, or fluoroanthrecenyloxy. In other embodiments, $R^{11}$, $R^{12}$, and $R^{13}$ are independently methyl, trifluoromethyl, prop-2-yl, 1,1,1,3,3,3-hexafluoroprop-2-yl, 1,1,1,3,3,3-hexafluoro-2-phenyl-prop-2-yl, 1,1,1,3,3,3-hexafluoroprop-2-oxy, phenyloxy, 4-fluorophenyloxy, 2,4-difluorophenyloxy, 2,3,5,6-tetrafluorophenyloxy, pentafluorophenyloxy, 3-trifluoromethylphenyloxy, 3,5-bis(trifluoromethyl)phenyloxy, 2,4-difluorophenyl, 3-trifluorophenyl, 2,5-bis(trifluoromethyl)phenyl, 4-fluorophenyl, 2,4-bisfluorophenyl, pentafluorophenyl, 2-trifluoromethylphenyl, phenyl, or 3,5-difluorophenyl. In any of the above embodiments, $R^{14}$ and $R^{15}$ are independently $C_1$-$C_6$ alkyl, $C_1$-$C_6$ fluoroalkyl, phenyl, fluorophenyl, naphthyl, fluoronaphthyl, anthracenyl, or fluoroanthracenyl. In any of the above embodiments, $R^{14}$ and $R^{15}$ are independently 1,1,1,3,3,3-hexafluoroprop-2-yl, phenyl, fluorophenyl, naphthyl, fluoronaphthyl, anthracenyl, or fluoroanthracenyl. In any of the above embodiments, $R^{14}$ and $R^{15}$ join together to form a compound of Formula:

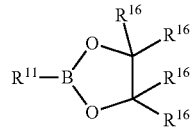

where each $R^{16}$ is independently H, alkyl, or haloalkyl. In some embodiments, $R^{16}$ is methyl or trifluoromethyl.

Illustrative boron-containing compounds of Formulas V, VI, VII, VIII, and IX include, but are not limited to:

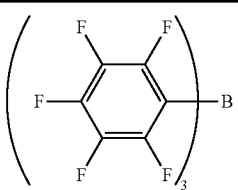 tris(pentafluorophenyl)borane $B(OCH_2F_3)_3$ tri(2,2-trifluoroethyl)borate

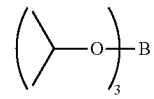 tri(isopropyl)borate

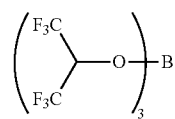 tris(1,1,1,3,3,3-hexafluoropropan-2-yl)borate

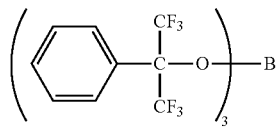 tris(1,1,1,3,3,3-hexafluoro-2-phenyl-propan-2-yl)borate $B[OC(CF_3)_3]_3$ tris(1,1,1,3,3,3-hexafluoro-2-(trifluoromethyl)propan-2-yl)borate $B(OPh)_3$ triphenyl borate

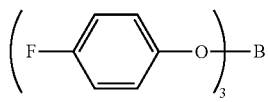 tris(4-fluorophenyl) borate

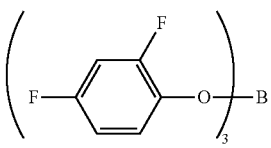 tris(2,4-difluorophenyl) borate

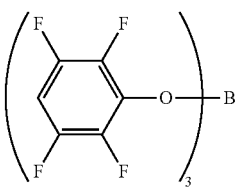 tris(2,3,5,6-tetrafluorophenyl) borate

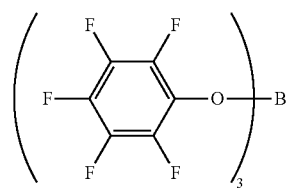 tris(pentafluorophenyl)borate

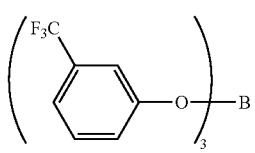 tris(3-(trifluoromethyl)phenyl)borate

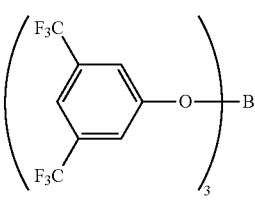 tris(3,5-bis(trifluoromethyl)phenyl)borate

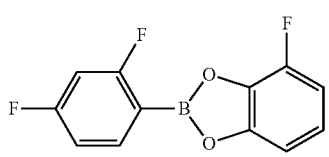 [SMILES: Fc1ccc(B2Oc3cccc(F)c3O2)c(F)c1] 2-(2,4-difluorophenyl)-4-fluoro-1,3,2-benzodioxaborole

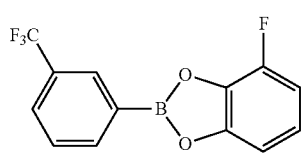 [SMILES: Fc1cccc2c1OB(c1cccc(C(F)(F)F)c1)O2] 2-(3-trifluoromethylphenyl)-4-fluoro-1,3,2-benzodioxaborole

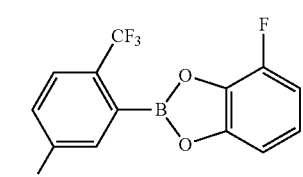 2,5-bis(trifluoromethyl)phenyl-4-fluoro-1,3,2-benzodioxaborole

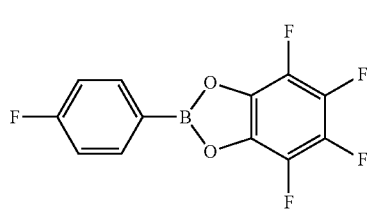 [SMILES: Fc1ccc(B2Oc3c(F)c(F)c(F)c(F)c3O2)cc1] 2-(4-fluorophenyl)-tetrafluoro-1,3,2-benzodioxaborole

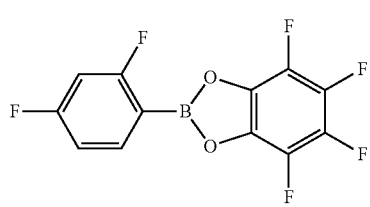 [SMILES: Fc1ccc(B2Oc3c(F)c(F)c(F)c(F)c3O2)c(F)c1] 2-(2,4-difluorophenyl)-tetrafluoro-1,3,2-benzodioxaborole

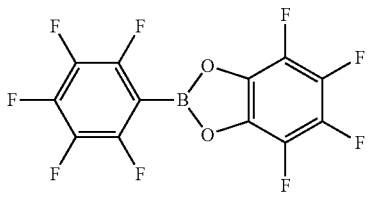 [SMILES: Fc1c(F)c(F)c(B2Oc3c(F)c(F)c(F)c(F)c3O2)c(F)c1F] 2-(pentafluorophenyl)-tetrafluoro-1,3,2-benzodioxaborole

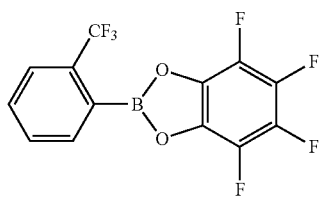 [SMILES: Fc1c(F)c(F)c2c(c1F)OB(c1ccccc1C(F)(F)F)O2] 2-(2-trifluoromethylphenyl)-tetrafluoro-1,3,2-benzodioxaborole

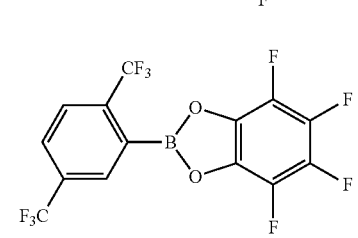 2,5-bis(trifluoromethylphenyl)-tetrafluoro-1,3,2-benzodioxaborole

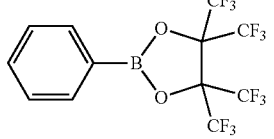 2-phenyl-4,4,5,5-tetra(trifluoromethyl)-1,3,2-benzodioxaborolane

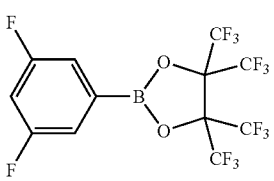 2-(3,5-difluorophenyl-4,4,5,5-tetrakis(trifluoromethyl)-1,3,2-dioxaborolane

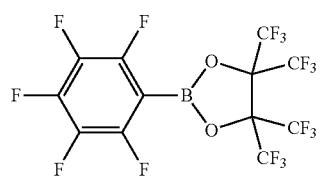 2-pentafluorophenyl-4,4,5,5-tetrakis(trifluoromethyl)-1,3,2-dioxaborolane

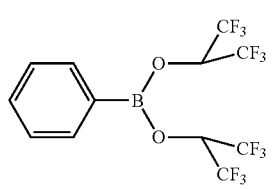 [SMILES: FC(F)(F)C(OB(OC(C(F)(F)F)C(F)(F)F)c1ccccc1)C(F)(F)F] bis(1,1,1,3,3,3-hexafluoroisopropyl)phenylboronate

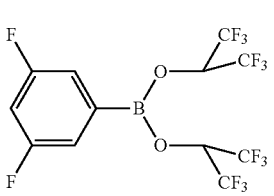 [SMILES: Fc1cc(F)cc(B(OC(C(F)(F)F)C(F)(F)F)OC(C(F)(F)F)C(F)(F)F)c1] bis(1,1,1,3,3,3-hexafluoroisopropyl)-3,5-difluorophenylboronate

-continued

| Structure | Name |
|---|---|
| 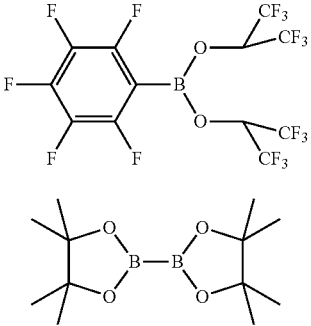 | bis(1,1,1,3,3,3-hexafluoroisopropyl) pentafluorophenylboronate |
| 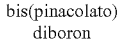 | bis(pinacolato)diboron |
| 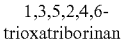 | 1,3,5,2,4,6-trioxatriborinane |
| B[O(CH$_2$CH$_2$O)$_n$CH$_3$]$_3$ | tri(ethylene glycol methyl ether)borate (n = 1) tri(bis(ethylene glycol) methyl ether)borate (n = 2) tri(tri(ethylene glycol) methyl ether)borate (n = 3) tri(tetra(ethylene glycol) methyl ether) borate (n = 4) tri(penta(ethylene glycol) methyl ether) borate (n = 5) tri(hex(ethylene glycol) methyl ether) borate (n = 6) tri(hepta(ethylene glycol) methyl ether) borate (n = 7) | or a mixture of any two or more thereof.

In some preferred embodiments, the anion receptor is one or more of tri(2,2,2-trifluoroethyl)borate, bis(pinacolato)diboron, 1,3,5,2,4,6-trioxatriborinane, tri(ethylene glycol methyl ether)borate, tri(bis(ethylene glycol) methyl ether) borate, tri(tri(ethylene glycol) methyl ether)borate, tri(tetra (ethylene glycol) methyl ether)borate, tri(penta(ethylene glycol) methyl ether)borate, tri(hexa(ethylene glycol) methyl ether)borate, or tri(hepta(ethylene glycol) methyl ether)borate.

Suitable solvents for the non-aqueous electrolyte include carbonate-based solvents, oligo(ethyleneglycol)-based solvents, fluorinated oligomers, dimethoxyethane, triglyme, dimethylvinylene carbonate, tetraethyleneglycol, dimethyl ether, polyethylene glycols, sulfones, sulfolane, and γ-butyrolactone. Of course, the solvent may be a mixtures of such solvents. The solvents support lithium-ion and oxygen transport through electrochemical cells prepared with the solvents.

The carbonate-based solvents include those such as, but not limited to, dimethyl carbonate, ethyl methyl carbonate, diethyl carbonate, methyl propyl carbonate, ethyl propyl carbonate, dipropyl carbonate, bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, or perfluorobutyl ethyl carbonate.

Oligo(ethylene glycol)-based solvents which may be used in the electrolytes include those having at least one end of the chain capped by a silicon-contained group (e.g. a silane or siloxane), a boron-containing group, and/or a phosphorous-containing group (phosphates). In some embodiments, the oligo(ethylene glycol)-based solvent has one or more oligo (ethylene glycol) groups attached to the boron atom. In some embodiments, the oligo(ethylene glycol)-based solvent has one or more oligo(ethylene glycol) groups attached to the silicon atom. In some other embodiments, the oligo(ethylene glycol)-based solvent has one or more oligo(ethylene glycol) groups attached to the phosphorous atom. In some embodiments, the oligo(ethylene glycol)-based solvent has at least one B atom, and/or at least one Si atom and/or at least one P atom.

The oligo(ethylene glycol)-based solvents readily dissolve the lithium salt that is used in the electrolyte, and provide the required low viscosity for better performance. In some embodiments, the electrolytes include all types of oligo(ethylene glycol)-based solvents having an oligo(ethylene glycol) as side chain linked to a Si, B or P atom. In some embodiments, the oligo(ethylene glycol)-based solvent includes a compound of Formula Ia, Ib, Ic, Id, Ie, If, Ig, Ih, Ii, or Ij:

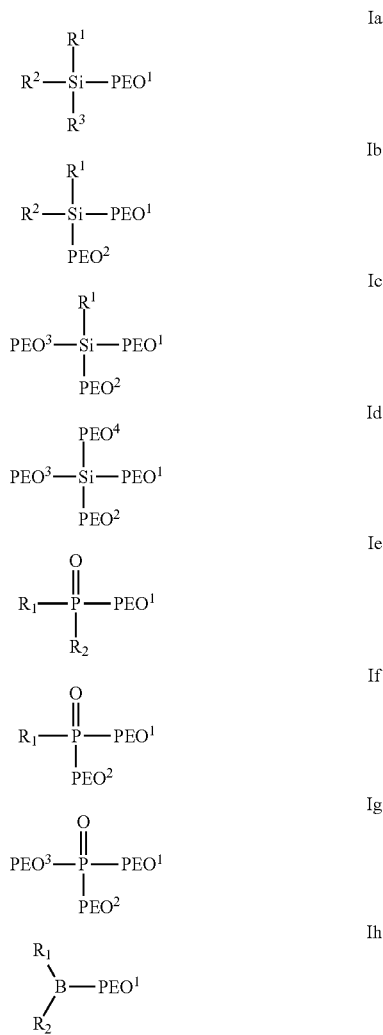

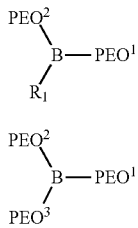

$R^1$, $R^2$, and $R^3$ are independently H, alkyl having from 1 to 12 carbon atoms, alkenyl having from 2 to 12 carbon atoms, or a group of Formula IIa, IIb, IIc, IId, IIe, IIf, IIg, IIh, IIi, IIj, IIk, or IIm;

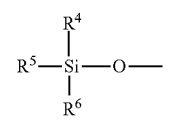

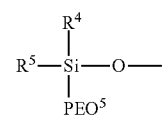

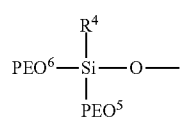

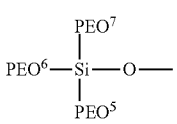

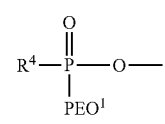

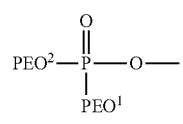

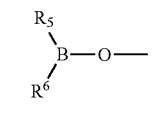

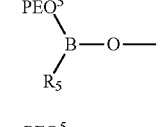

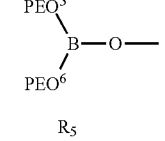

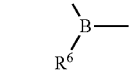

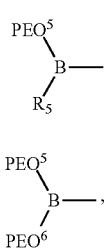

where $R^4$, $R^5$, and $R^6$ are independently alkyl having from 1 to 12 carbon atoms or alkenyl having from 2 to 12 carbon atoms; and $PEO^1$, $PEO^2$, $PEO^3$, $PEO^4$, $PEO^5$, $PEO^6$, and $PEO^7$ are independently a oligo(ethylene glycol) group; with the proviso that when the oligo(ethylene glycol) siloxane is a compound of Formula Ia and $R^1$ is a group of Formula IIa or IIb, then at least one of $R^2$, $R^3$, $R^4$, $R^5$, and $R^6$ is other than alkyl. In some embodiments, $R^1$, $R^2$, and $R^3$ are independently alkyl having from 1 to 12 carbon atoms, alkenyl having from 2 to 12 carbon atoms, or a group of Formula IIa, IIb, IIc, IId, IIe, IIf, IIg, IIh, IIi, IIj, IIk, or IIm. In other embodiments, $R^1$, $R^2$, $R^3$, $R^4$, $R^5$, and $R^6$ are methyl.

In some embodiments, the oligo(ethyleneoxide) solvent comprises a compound of Formula Ib, Ic, or Id. In some embodiments, $PEO^1$, $PEO^2$, $PEO^3$, $PEO^4$, $PEO^5$, $PEO^6$, and $PEO^7$ are independently represented by Formula IIIa or IIIb;

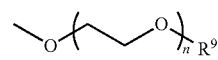

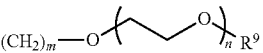

where; $R^9$ is alkyl having from 1 to 12 carbon atoms, alkenyl having from 2 to 12 carbon atoms, or a group of Formula IV,

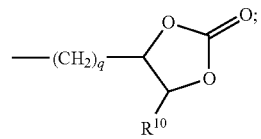

where $R^{10}$ is H, alkyl having from 1 to 12 carbon atoms, or alkenyl having from 2 to 12 carbon atoms; m represents an integer from 1 to 8, n represents an integer from 0 to 20, and q represents an integer from 0 to 8.

According to various embodiments, the oligo(ethylene glycol)-based solvents are those such as, but not limited to, 1NM2, 1NM3, or 2SM3:

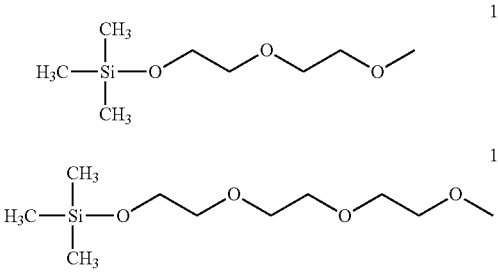
1NM2
1NM3
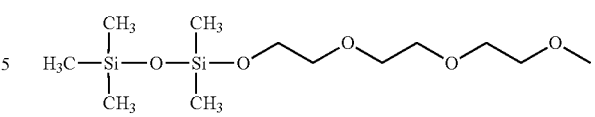
2SM3
In another embodiment, the electrolyte may include a silicon-carbonate compound (i.e. silanyl, or siloxanyl carbonate) as an additive to the electrolyte. Such compounds have both a silanyl or siloxyl group and a carbonate group in the compound. For example such compounds include, but are not limited to:
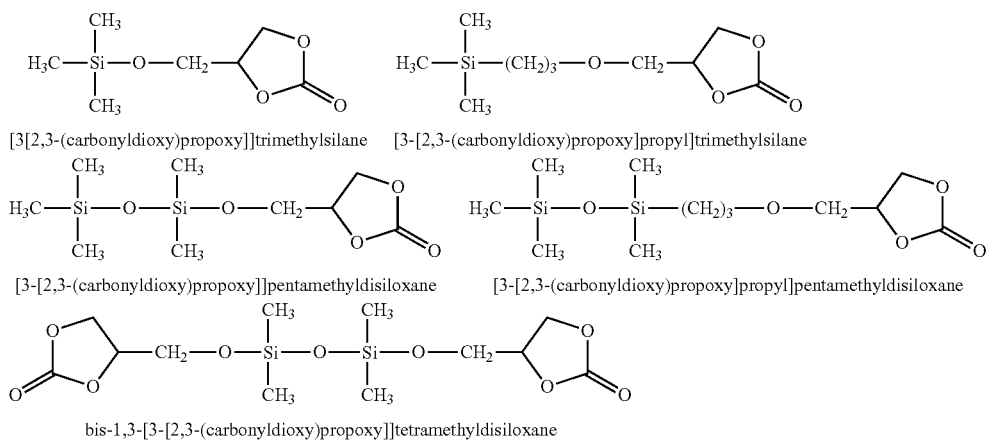
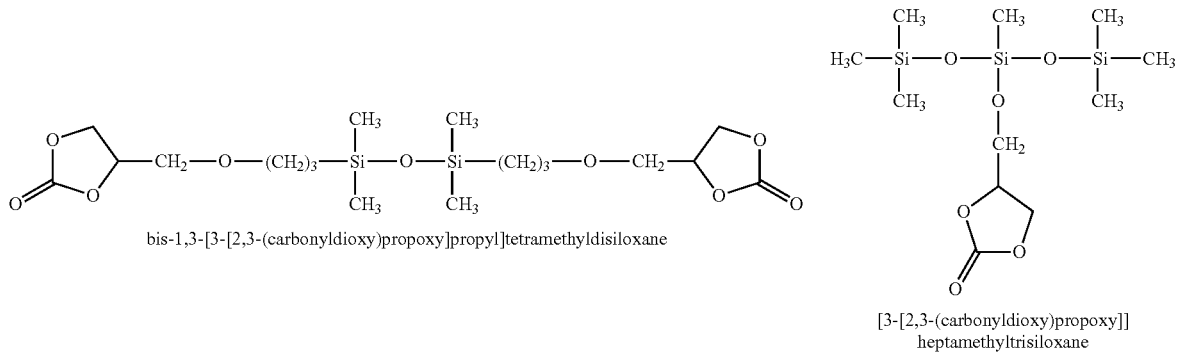
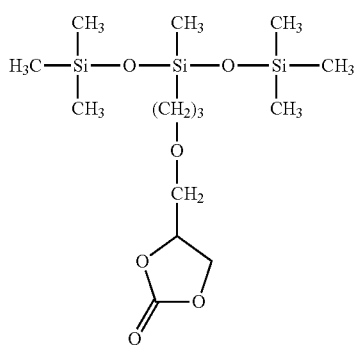
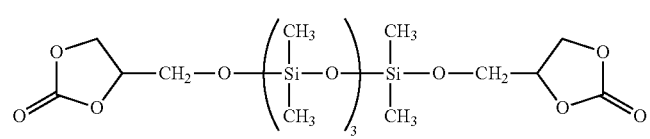

-continued

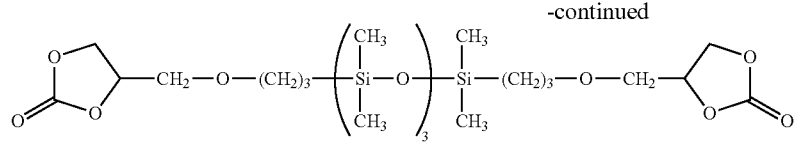

bis-1,7-[3-[2,3-(carbonyldioxy)propoxy]propyl]octamethyltetrasiloxane, or a mixture of any two or more such compounds.

In some embodiments, the electrolyte may also include an additive such as, but not limited to, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methylpyrrole, naphthalene, 3,9divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9diethylidene-1,5,7,11-tetraoxaspiro[5.5]undecane, or a mixture of any two or more thereof. Other additives may be used instead or in conjunction with the above additives include, but are not limited to, lithium (chelato)borates such as $Li[B(C_2O_4)_2]$ and $Li[BF_2C_2O_4]$; or lithium (chelato)phosphates such as $Li[PF_4(C_2O_4)]$ and $Li[PF_2(C_2O_4)_2]$, where in such embodiments, the lithium salt in the electrolyte is other than may be other than $Li[B(C_2O_4)_2]$; $Li[BF_2C_2O_4]$; $Li[PF_4(C_2O_4)]$; or $Li[PF_2(C_2O_4)_2]$. An additive may be added to the electrolyte from about 0.001 to about 10 wt %. In some other embodiments, the lithium salt may be other than $Li_2B_{12}X_{12-n}H_n$, wherein X is OH, F, Cl, or Br, and n ranges from 0 to 12, or $Li_2B_{10}X_{10-n}H_n$, wherein X is OH, F, Cl, or Br, and n ranges from 0 to 10; and the electrolyte may include, as a electrolyte additive, $Li_2B_{12}X_{12-n}H_n$, wherein X is OH, F, Cl, or Br, and n ranges from 0 to 12, or $Li_2B_{10}X_{10-n}H_n$, wherein X is OH, F, Cl, or Br, and n ranges from 0 to 10, or a mixture of two or more thereof, at, e.g., about 0.001 to about 15 wt % for overcharge protection of lithium air cells.

In some embodiments, each of the above additives is present at a concentration of about 0.001 to about 15 wt % of the overall electrolyte weight. In other such embodiments, the additive(s) is present from about 0.001 to about 10 wt %, from about 0.001 to about 5 wt %, from about 0.01 to about 10 wt %, from about 0.01 to about 5 wt %, from about 0.05 to about 3 wt %, or from about 0.1 to about 3 wt %.

In some embodiments, the lithium salt is not particularly limited, as long as it dissolves in the solvents and additives and serves as an electrolyte for a lithium air battery. Illustrative lithium salts that may be used in the electrolytes include, but are not limited to, $LiClO_4$, $LiBF_4$, $LiAsF_6$, $LiSbF_6$, $LiPF_6$, $LiCF_3SO_3$, $Li(CF_3SO_2)_2N$, $Li(CF_3SO_2)_3C$, $LiC_6F_5SO_3$, $LiAlCl_4$, $LiGaCl_4$, $LiSCN$, $LiO_2$, $LiCO_2CF_3$, $LiN(SO_2C_2F_5)_2$, lithium alkyl fluorophosphates, lithium bis(oxalato)borates $Li[B(C_2O_4)_2]$ and $Li[BF_2C_2O_4]$, $Li_2B_{12}X_{12-n}H_n$, wherein X is OH, F, Cl, or Br, and n ranges from 0 to 12, or $Li_2B_{10}X_{10-n}H_n$, wherein X is OH, F, Cl, or Br, and n ranges from 0 to 10.

In some other embodiments, the molar ratio of the lithium salt in the oligo(ethyleneglycol) solvent-based electrolyte is from 0.01 M to 1.5 M, from 0.05 M to 1.2 M, or from 0.4 M to 1.0 M. If the concentration of the lithium salt is smaller than 0.01 M, the ionic conductivity of the resulting non-aqueous electrolyte is significantly decreased because of an inadequate number of carrier ions are in the electrolyte. In some embodiments, the non-aqueous electrolytes further include one or more additional electrolyte additives. In some other embodiments, the electrolytes may include those additional additives protect the electrodes from degradation, such as are disclosed in co-pending U.S. patent application Ser. Nos. 10/857,365; 11/297,120; and 11/338,902. In some embodiments, the electrolytes include stabilizing additives that can be oxidized or polymerized on the surface of the positive electrode to form a passivation film on the surface of the cathode. In some other embodiments, electrolytes further include mixtures of the two types of electrode stabilizing additives. The additives are typically present at a concentration of about 0.001 to about 10 wt %.

In some embodiments, the additives cited above can be use as single or as blend of two or more additive in the electrolyte. The electrolyte can be either oligo(ethylene glycol)-based electrolyte described above or a conventional carbonate based electrolyte or a mix of both.

In another aspect, a lithium-air battery is provided which contains an anode, an air cathode and any of the above described non-aqueous electrolytes. The non-aqueous electrolytes have been found to provide superior charge efficiency and charge/discharge cycle characteristics in lithium air batteries.

In some embodiments, the electrolyte is a gel electrolyte including a oligo(ethylene glycol)-based solvent, a lithium salt; an anion receptor, a crosslinking agent, a monofunctional monomeric compound; and a radical reaction initiator. In some embodiments, the gel electrolyte can also include other electrode stabilization additives and other electrolyte additives. The solvent, lithium salt, and anion receptor are as described above. The crosslinking agent, monomers, and initiators are described below.

Suitable crosslinking agents include those of Formula X:

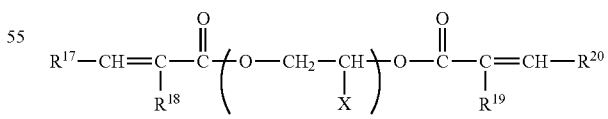

where $R^{17}$, $R^{18}$, $R^{19}$, and $R^{20}$ are independently hydrogen, alkyl having from 1 to 12 carbon atoms, or alkenyl having from 2 to 12 carbon atoms; and where X is a hydrogen, methyl or ethyl group, and n represents a numeral 1 to 15, inclusive. In some embodiments, $R^{17}$, $R^{18}$, $R^{19}$, and $R^{20}$ are independently hydrogen or methyl. In some embodiments, $R^{17}$, $R^{18}$, $R^{19}$, and $R^{20}$ are independently hydrogen or methyl and X is H.

In some embodiments, monofunctional monomeric compounds may be used for the control of the crosslinking density of the gel electrolyte. Suitable monofunctional monomeric compounds include those of Formula XI:

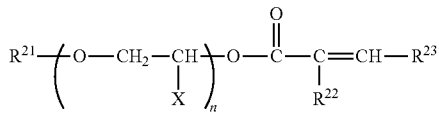

where $R^{21}$ is alkyl having from 1 to 12 carbon atoms; $R^{22}$ and $R^{23}$ are independently a hydrogen, alkyl having from 1 to 12 carbon atoms, or alkenyl having from 2 to 12 carbon atoms; X is hydrogen, methyl or ethyl group; and n represents a numeral from 1 to 20, inclusive. In some embodiments, $R^{21}$, $R^{22}$, and $R^{23}$ are independently hydrogen or methyl. In some embodiments, $R^{21}$, $R^{22}$, and $R^{23}$ are independently hydrogen or methyl and X is H.

Crosslinking agents and monofunctional monomeric compounds provide a physical framework, or gel, after crosslinking to host the liquid phase. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted. Polymerization of crosslinking agents and monofunctional monomeric compounds are known to those of skill in the art. For example, these monomeric species may be polymerized by thermal- and/or photo-initiation. Representative thermal initiators include, but are not limited to, azo compounds, peroxide compounds, a bismaleimide, or a mixture of any two or more thereof. One example of an azo compound is azoisobutyronitrile. One example of a peroxide compound is benzoylperoxide. Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]ethyl ester, α,α-dimethoxy-a-phenylacetophenone, 2-benzyl-2-(dimethylamino)-1-[4-(4-morpholinyl)phenyl]-1-propanone, diphenyl(2,4,6-trimethylthio)phenyl)-phosphine oxide, phosphine oxide, phenyl bis(2,4,6-trimethyl benzoyl), bis(eta 5-2,4-cyclopentadien-1-yl)bis[2,6-difluoro-3-(1-H-pyrrol-1-yl)phenyl]titanium, iodonium (4-methylphenyl)-[4-(2-methylpropyl)phenyl]-hexafluorophosphate, or a mixture of two or more thereof. In some instances the photoinitiator is a UV initiator.

In some other embodiments, the electrolyte is a gel electrolyte based on a polysiloxane polymer system obtained by a cross-linking reaction between a partial PEO-substituted polymethylhydrosiloxane and a crosslinker, wherein the crosslinker comprises $CH_2=CH_2CH_2O(CH_2CH_2O)_q$ $CH_2CH_2=CH_2$ and $CH_2=CH_2CH_2OSiO(SiO)_k$ $SiCH_2CH_2=CH_2$. The first crosslinker of diallyl-terminated poly(ethylene glycol) has a molecular weight from 200 to 800. The crosslinking reaction is initiated by a platinum catalyst at elevated temperature, wherein the catalyst is a complex of Pt(O) with divinyltetramethyldisiloxane or $H_2PtCl_6$. In some embodiments, the polysiloxane based gel electrolyte can also include other electrode stabilizing additives and other electrolyte additives.

In another aspect, a lithium air cell includes an electrolyte embodied herein, a lithium negative electrode and an air positive electrode.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, the term "gelled electrolyte" refers to the incorporation of polymerizable materials that will form a gel, thus providing viscosity and body to the electrolyte, while still allowing for ion transport within the electrolyte.

Alkyl groups include straight chain and branched alkyl groups having from 1 to 12 carbon atoms or, in some embodiments, from 1 to 8, 1 to 6, or 1 to 4 carbon atoms. Alkyl groups further include cycloalkyl groups as defined below. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems. Substituted cycloalkyl groups may be substituted one or more times with non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Alkenyl groups include straight and branched chain and cycloalkyl groups as defined above, except that at least one double bond exists between two carbon atoms. Thus, alkenyl groups have from 2 to about 12 carbon atoms in some embodiments, from 2 to 10 carbon atoms in other embodiments, and from 2 to 8 carbon atoms in other embodiments. Examples include, but are not limited to vinyl, allyl, —CH=CH($CH_3$), —CH=C($CH_3$)$_2$, —C($CH_3$)=CH$_2$, —C($CH_3$)=CH($CH_3$), —C($CH_2CH_3$)=CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Aryl groups are cyclic aromatic hydrocarbons of 6 to 14 carbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain from 6 to 12 or even 6 to 10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halogen groups, bonded to one of the ring members. Rather, groups such as tolyl are referred to as substituted aryl groups. Representative substituted aryl groups may be monosubstituted or substituted more than once. For example, monosubstituted aryl groups include, but are not limited to, 2-, 3-, 4-, 5-, or 6-substituted phenyl or naphthyl groups, which may be substituted with substituents such as those listed above.

Alkoxy groups are hydroxyl groups (—OH) in which the bond to the hydrogen atom is replaced by a bond to a carbon atom of an alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Representative substituted alkoxy groups may be substituted one or more times with substituents such as those listed above. Aryloxy groups are hydroxyl groups (—OH) in which the bond to the hydrogen atom is replaced by a bond to a carbon atom of an aryl group as defined above.

Haloalkyl groups are alkyl groups in which one or more hydrogen atoms on the alkyl group has been replaced by a halogen atom. Haloaryl groups are aryl groups in which one or more hydrogen atoms on the aryl group has been replaced by a halogen atom.

In general, "substituted" refers to an alkyl or alkenyl group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

The processes and products illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

One skilled in the art will readily realize that all ranges discussed can and do necessarily also describe all subranges therein for all purposes, and that all such subranges also form part and parcel of this disclosure. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

To illustrate the performance of the present electrolytes, a series of lithium air cells were prepared. The electrolytes were prepared with 1.0 M LiTFSI (lithium bis(trifluoromethanesulfonyl)imide) in 2SM3 as the solvent, and with 2 wt % of $Li[BF_2C_2O_4]$. FIG. 1 illustrates the cycling performance of this electrolyte system. The figures shows that the electrolyte is stable compared to a similar cell with conventional 1.0 M LiTFSI in PC and EMC (the "SOA" electrolyte). In contrast to the SOA electrolyte, which showed a lower specific capacity and significant cycling decays (as shown in FIG. 2), the present electrolyte system exhibit superior cycling performance.

Figure 2:
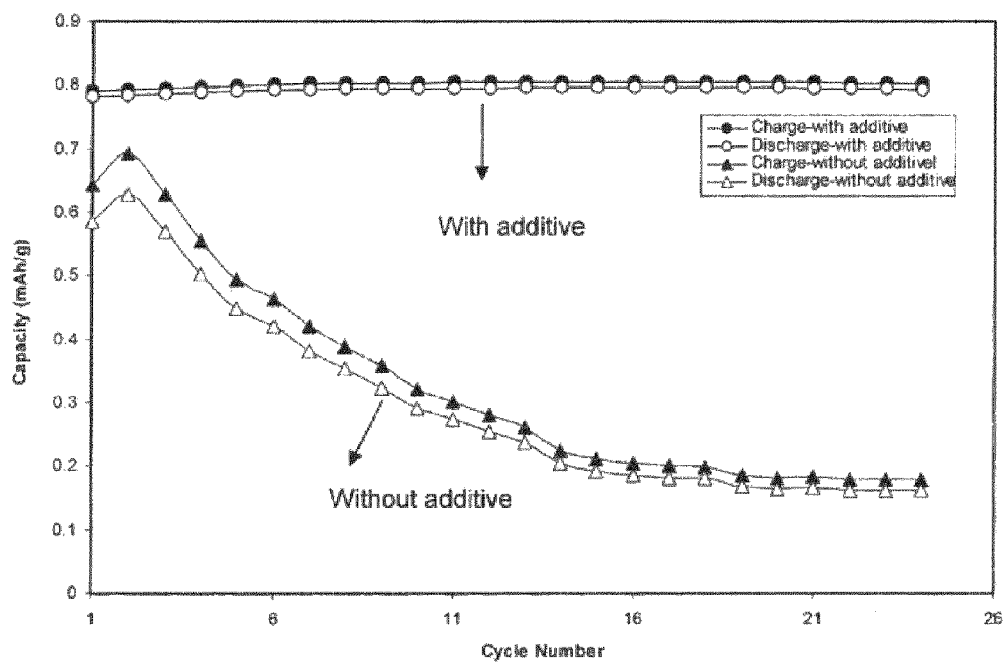
FIG. 2 is a graph showing the cycling performance comparison of a lithium air cell by using 1.0 M LiTFSI in propylene carbonate (PC) and ethyl methyl carbonate (EMC) in the ratio of 3:7, and which also includes 3 wt % tris(pentafluorophenyl)borane.

In FIG. 2, the additive effect on the lithium air cell cycling is illustrated. In this test, 3 wt % of tris(pentafluorophenyl)borane was added to a conventional electrolyte of 1.0M LiTFSI in PC and EMC (SOA). As observed from the graph, the cell which incorporates the borane-based additives provide a greatly increased specific capacity and better cycling performance than the cell with only the SOA electrolyte. The new electrolytes may be readily implemented in connection with conventional processing and manufacturing techniques, and confer significant advantage upon the art.

While exemplary embodiments are described herein, it should be understood that changes and modifications can be made therein in accordance with ordinary skill in the art without departing from the invention in its broader aspects as defined in the following claims.

What is claimed is:

1. A lithium-air cell comprising:
 a negative electrode;
 an air positive electrode; and
 a non-aqueous electrolyte comprising an anion receptor selected from the group consisting of tri(2,2,2-trifluoroethyl)borate, bis(pinacolato)diboron, 1,3,5,2,4,6-trioxatriborinane, tri(ethylene glycol methyl ether)borate, tri(bis(ethylene glycol) methyl ether)borate, tri(tri (ethylene glycol) methyl ether)borate, tri(tetra(ethylene glycol) methyl ether)borate, tri(penta(ethylene glycol) methyl ether)borate, tri(hexa(ethylene glycol) methyl ether)borate, tri(hepta(ethylene glycol) methyl ether) borate, and a mixture of any two or more thereof.

2. The lithium air cell of claim 1, wherein the non-aqueous electrolyte further comprises: a poly(ethyleneoxide) solvent which is a compound of Formula Ia, Ib, Ic, Id, Ie, If, Ig, Ih, Ii, or Ij or a mixture of any two or more thereof:

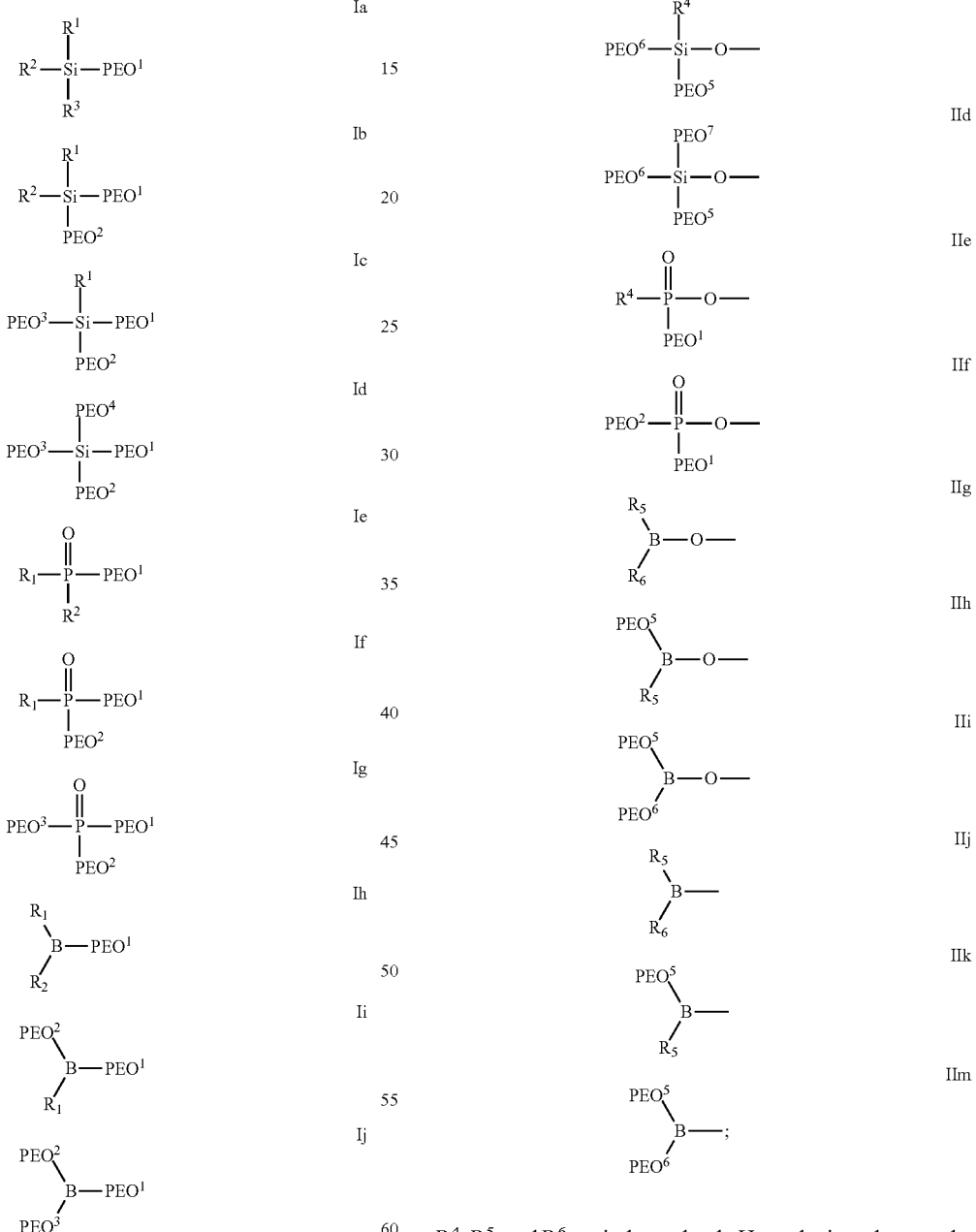

$R^1$, $R^2$, and $R^3$ are independently H, a substituted or unsubstituted alkyl group having from 1 to 12 carbon atoms, a substituted or unsubstituted alkenyl group having from 2 to 12 carbon atoms, or a group of Formula IIa, IIb, IIc, IId, IIe, IIf, IIg, IIh, IIi, IIj, IIk, IIl, IIm;

$R^4$, $R^5$, and $R^6$ are independently H, a substituted or unsubstituted alkyl group having from 1 to 12 carbon atoms, or a substituted or unsubstituted alkenyl group having from 2 to 12 carbon atoms; and $PEO^1$, $PEO^2$, $PEO^3$, $PEO^4$, $PEO^5$, $PEO^6$, and $PEO^7$ are independently a poly(ethyleneoxide) group; with the proviso that when the poly(ethyleneoxide) siloxane is a compound of Formula Ia and R¹ is a group of Formula IIa or IIb, then at least one of R², R³, R⁴, R⁵, and R⁶ is other than alkyl.

3. The lithium air cell of claim 2, wherein the poly(ethyleneoxide) solvent comprises a compound represented by Formula Ia, Ib, Ic, Id, Ie, If, or a mixture of any two or more thereof.

4. The lithium-air cell of claim 2, wherein the poly(ethyleneoxide) solvent comprises a compound represented by Formula Ib, Ic, Id, or a mixture of any two or more thereof.

5. The lithium-air cell of claim 2, wherein $PEO^1$, $PEO^2$, $PEO^3$, and $PEO^4$ are independently represented by Formula IIIa or IIIb;

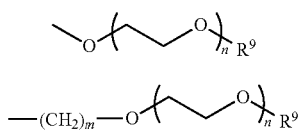

IIIa

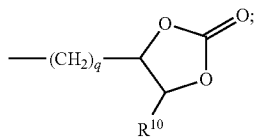

IIIb wherein;
  $R^9$ is H, a substituted or unsubstituted alkyl group having from 1 to 12 carbon atoms, a substituted or unsubstituted alkenyl group having from 2 to 12 carbon atoms, or a group of Formula IV,

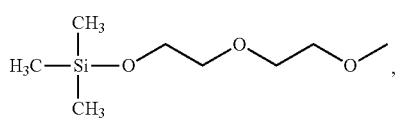

IV $R^{10}$ is H, a substituted or unsubstituted alkyl group having from 1 to 12 carbon atoms, or a substituted or unsubstituted alkenyl group having from 2 to 12 carbon atoms;
  m represents an integer from 1 to 8,
  n represents an integer from 0 to 20, and
  q represents an integer from 0 to 8.

6. The lithium-air cell of claim 2, wherein the poly(ethyleneoxide) solvent comprises:
  a compound of Formula Ie, If, Ig, or a mixture of any two or more thereof; or
  a mixture of a compound of Formula Ie, If, or Ig, and a compound of Formula Ia, Ib, Ic, or Id.

7. The lithium-air cell of claim 2, wherein at least one of $R_1$, $R_2$, or $R_3$ is a group of Formula IIa, IIb, IIc, or IId.

8. The lithium-air cell of claim 2, wherein the non-aqueous electrolyte comprises a siloxanyl carbonate.

9. The lithium-air cell of claim 5, wherein the siloxanyl carbonate is 1-[1-trimethylsiloxanyl-ethyl]ethylene carbonate.

10. The lithium-air cell of claim 2, wherein the poly(ethyleneoxide) solvent comprises,

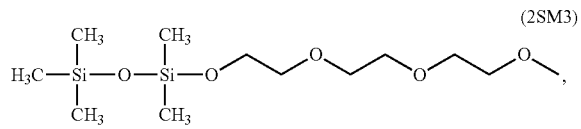

(1NM2)

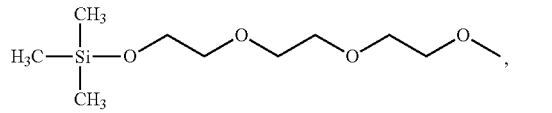

(1NM3)

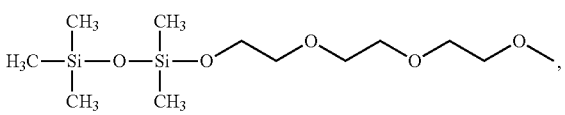

(2SM3)

[3-[2,3-(carbonyldioxy)propoxy]]trimethylsilane,
[3-[2,3-(carbonyldioxy)propoxy]propyl]trimethylsilane,
[3-[2,3-(carbonyldioxy)propoxy]]pentamethyldisiloxane,
[3-[2,3-(carbonyldioxy)propoxy]propyl]pentamethyldisiloxane,
bis-1,3-[3-[2,3-(carbonyldioxy)propoxy]]tetramethyldisiloxane,
bis-1,3-[3-[2,3-(carbonyldioxy)propoxy]propyl]tetramethyldisiloxane, [3-[2,3-(carbonyldioxy)propoxy]]heptamethyltrisiloxane,
[3-[2,3-(carbonyldioxy)propoxy]propyl]heptamethyltrisiloxane,
bis-1,7-[3-[2,3-(carbonyldioxy)propoxy]]octamethyltetrasiloxane, or
bis-1,7-[3-[2,3-(carbonyldioxy)propoxy]propyl]octamethyltetrasiloxane.

11. The lithium-air cell of claim 2, wherein the poly(ethyleneoxide) solvent comprises

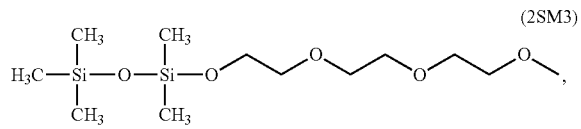

(2SM3)

[3-[2,3-(carbonyldioxy)propoxy]propyl]pentamethyldisiloxane,
bis-1,3-[3-[2,3-(carbonyldioxy)propoxy]]tetramethyldisiloxane,
bis-1,3-[3-[2,3-(carbonyldioxy)propoxy]propyl]tetramethyldisiloxane,
[3-[2,3-(carbonyldioxy)propoxy]]heptamethyltrisiloxane,
[3-[2,3-(carbonyldioxy)propoxy]propyl]heptamethyltrisiloxane,
bis-1,7-[3-[2,3-(carbonyldioxy)propoxy]]octamethyltetrasiloxane, or
bis-1,7-[3-[2,3-(carbonyldioxy)propoxy]propyl]octamethyltetrasiloxane.

12. The lithium-air cell of claim 2, wherein the poly(ethyleneoxide) solvent is a poly(ethyleneoxide) siloxane selected from 2-[2-[2-[2-methoxy]ethoxy]ethoxy]ethoxy trimethyl silane, 2-[2-[2-methoxy]ethoxy]-ethoxy trimethyl silane, or a mixture thereof.

13. The lithium-air cell of claim 2, wherein the poly(ethyleneoxide) solvent is present from about 5 wt % to about 95 wt %, wherein the wt % is calculated on the total weight of the poly(ethyleneoxide) solvent, the salt, and the electrode stabilizing additive.

14. The lithium-air cell of claim 2, wherein the non-aqueous electrolye further comprises a lithium salt.

15. The lithium-air cell of claim 14, wherein the lithium salt is selected from the group consisting of $LiCF_3CO_2$, $LiC_2F_5CO_2$, LiClO4, $LiBF_4$, $LiAsF_6$, $LiPF_6$, $LiPF_2(C_2O_2)$, $LiPF_4C_2O_4$, $LiCF_3SO_3$, $LiN(CF_3SO_2)_2$, $LiC(CF_3SO_2)_3$, $LiN(SO_2C_2F_5)_2$), lithium alkyl fluorophosphates, $Li(C_2O_4)_2$, $LiBF_2C_2O_4$, $Li_2B_{12}X_{12-p}H_p$, $Li_2B_{10}X_{10-y}H_y$, and mixtures of any two or more thereof; X is selected from the group consisting of OH, F, Cl, and Br; p is 0, 1, 2, 3, 4, 5, 6, 7, 8, 9, 10, 11, or 12; and y is 0, 1, 2, 3, 4, 5, 6, 7, 8, 9, or 10.

16. The lithium-air cell of claim 1 further comprising an electrode stabilizing additive that can be oxidized or polymerized on the surface of a positive electrode, or can be reduced or polymerized on the surface of a negative electrode.

17. The lithium-air cell of claim 16, wherein the concentration of the electrode stabilizing additive is from about 0.001 wt % to about 10 wt %.

18. The lithium-air cell of claim 1, wherein the electrolyte is not a gelled electrolyte.

* * * * *